(12) United States Patent
Liu

(10) Patent No.: US 11,847,758 B2
(45) Date of Patent: Dec. 19, 2023

(54) MATERIAL DISPLAY METHOD AND APPARATUS, TERMINAL, AND STORAGE MEDIUM

(71) Applicant: BEIJING BYTEDANCE NETWORK TECHNOLOGY CO., LTD., Beijing (CN)

(72) Inventor: Shuai Liu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/858,526

(22) Filed: Jul. 6, 2022

(65) Prior Publication Data

US 2022/0335568 A1    Oct. 20, 2022

Related U.S. Application Data

(63) Continuation of application No. PCT/CN2021/070224, filed on Jan. 5, 2021.

(30) Foreign Application Priority Data

Jan. 6, 2020    (CN) .................. 202010010812.X

(51) Int. Cl.
  *G06T 3/40*    (2006.01)
  *G06F 3/14*    (2006.01)
  *G06F 21/62*   (2013.01)

(52) U.S. Cl.
  CPC ............... *G06T 3/40* (2013.01); *G06F 3/14* (2013.01); *G06F 21/629* (2013.01)

(58) Field of Classification Search
  None
  See application file for complete search history.

(56) References Cited

U.S. PATENT DOCUMENTS

| 2002/0057281 | A1* | 5/2002 | Moroo | G09G 5/391 |
| | | | | 345/668 |
| 2016/0353030 | A1* | 12/2016 | Gao | H04N 5/232935 |
| 2017/0347153 | A1* | 11/2017 | Zuo | H04N 21/440263 |
| 2018/0129657 | A1 | 5/2018 | Guest | |

(Continued)

FOREIGN PATENT DOCUMENTS

| CN | 104020928 A | 9/2014 |
| CN | 104822088 A | 8/2015 |

(Continued)

OTHER PUBLICATIONS

Machine Translation of CN106406902A (Year: 2017).*

(Continued)

*Primary Examiner* — Peter Hoang

(57) ABSTRACT

Provided are a material presentation method and apparatus, a terminal and a storage medium. The material presentation method includes steps described below. A to-be-presented splash presentation material is received. A splash presentation image of the to-be-presented splash presentation material is magnified, and the magnified splash presentation image is presented. In response to the presented magnified splash presentation image satisfying a minifying condition, the presented magnified splash presentation image is minified.

14 Claims, 3 Drawing Sheets

(56) References Cited

U.S. PATENT DOCUMENTS

2019/0019476 A1\* 1/2019 Ge .......................... G06F 3/048
2019/0325847 A1 10/2019 Kong et al.
2019/0347181 A1\* 11/2019 Cranfill ................ G06F 21/629

FOREIGN PATENT DOCUMENTS

| CN | 105656664 A | 6/2016 |
| --- | --- | --- |
| CN | 106406902 A | 2/2017 |
| CN | 108600855 A | 9/2018 |
| CN | 109471674 A | 3/2019 |
| CN | 110244996 A | 9/2019 |
| CN | 111221455 A | 6/2020 |
| WO | 2017096898 A1 | 6/2017 |

OTHER PUBLICATIONS

International Search Report dated Mar. 26, 2022 in International Application No. PCT/CN2021/070224 (2 pages) with an English translation (3 pages).
First Office Action dated Dec. 31, 2020 in Chinese Patent Application No. 202010010812.X (11 pages) with an English translation (10 pages).
Second Office Action dated Mar. 12, 2021 in Chinese Patent Application No. 202010010812.X (8 pages) with an English translation (10 pages).
Third Office Action dated Jun. 7, 2021 in Chinese Patent Application No. 202010010812.X (11 pages) with an English translation (10 pages).
Tencent, Toutiao and what kind of fancy advertising play Learn about, Jul. 17, 2019 (3 pages) with an English translation (4 pages).

\* cited by examiner

MATERIAL DISPLAY METHOD AND APPARATUS, TERMINAL, AND STORAGE MEDIUM

This is continuation of International Patent Application No. PCT/CN2021/070224, filed on Jan. 5, 2021, which is based on and claims priority to Chinese Patent Application No. 202010010812.X filed with the China National Intellectual Property Administration (CNIPA) on Jan. 6, 2020, the disclosures of which are incorporated herein by reference in their entireties.

TECHNICAL FIELD

The present disclosure relates to the field of computer technologies, for example, a material presentation method and apparatus, a terminal and a storage medium.

BACKGROUND

The emergence of smart phones and the wireless network not only solves the problem of poor communication between two or more parties, but also provides more choices for users in learning, working and entertainment. For example, a wide variety of clients are installed on mobile phones for watching videos, etc. The developers of the clients are also continuously optimizing the multiple presentation functions of the clients to meet users' personalized needs.

However, the splash presentation content of the client can generally only be displayed in part of the display interface of the terminal and cannot be displayed in full screen, resulting in poor viewing experience of users.

SUMMARY

The present disclosure provides a material presentation method and apparatus, a terminal and a storage medium.

A material presentation method is provided and includes steps described below.

A to-be-presented splash presentation material is received.

A splash presentation image of the to-be-presented splash presentation material is magnified, and the magnified splash presentation image is presented.

In a case where the presented magnified splash presentation image satisfies a minifying condition, the presented magnified splash presentation image is minified.

A material presentation apparatus is further provided and includes a material reception module, an image magnifying module and an image minifying module.

The material reception module is configured to receive a to-be-presented splash presentation material.

The image magnifying module is configured to magnify a splash presentation image of the splash presentation material, and present the magnified splash presentation image.

The image minifying module is configured to in a case where the presented magnified splash presentation image satisfies a minifying condition, gradually minify the presented magnified splash presentation image.

An electronic device is further provided. The electronic device includes one or more processing apparatuses and a memory configured to store one or more programs.

The one or more programs, when executed by the one or more processing apparatuses, cause the one or more processing apparatuses to implement the preceding material presentation method.

A computer-readable storage medium is further provided. The computer-readable storage medium stores a computer program which, when executed by a processor, implements the preceding material presentation method.

DETAILED DESCRIPTION

Embodiments of the present disclosure will be described below with reference to the drawings. Although the drawings show some embodiments of the present disclosure, the present disclosure may be implemented in various forms.

The various steps recited in method embodiments of the present disclosure may be performed in a different order and/or in parallel. In addition, the method embodiments may include additional steps and/or omit execution of illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given in the description hereinafter.

Concepts such as "first" and "second" in the present disclosure are merely intended to distinguish one from another apparatus, module or unit and are not intended to limit the order or interrelationship of the functions performed by the apparatus, module or unit.

"One" and "a plurality" mentioned in the present disclosure are illustrative, are not intended to limit the present disclosure, and should be understood as "one or more" unless clearly expressed in the context.

Embodiment One

Figure 1:
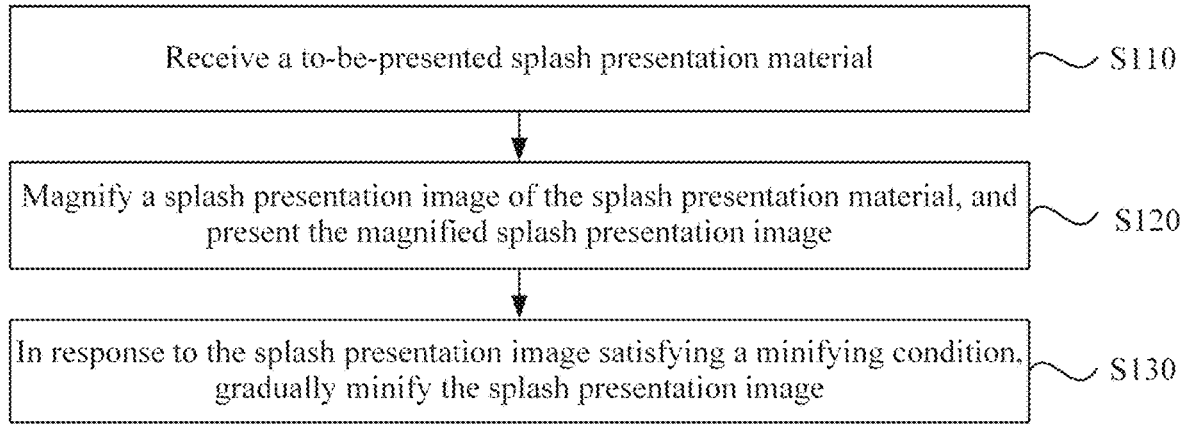
FIG. 1 is a flowchart of a material presentation method according to embodiment one of the present disclosure.

FIG. 1 is a flowchart of a material presentation method according to embodiment one of the present disclosure. The embodiment is applicable to the case of presenting landscape-mode material data. The method may be executed by a material presentation apparatus, which may be implemented by means of software and/or hardware and may be configured in a client for implement the material presentation method of the embodiment of the present disclosure.

As shown in FIG. 1, the method of the embodiment may include steps described below.

In S110, a to-be-presented splash presentation material is received.

In the embodiment of the present disclosure, the splash presentation material may be understood as material data presented before news feed material data is presented when the application software of a client is opened. For example, when the software of a short video application is opened, brand information of the application software or promotional information of a good may be presented before a short video recommendation list page is entered. At this time, the presented brand information or the advertising information of the good may be understood as the splash presentation material. The to-be-presented splash presentation material may be in the form of a picture, an animation, or a video, etc.

To speed up the response, at least one splash presentation material may be preloaded. The number of the preloaded splash presentation materials may be set according to actual situations and is not limited herein. The to-be-presented splash presentation material may be the same or different for different users. Which splash presentation material to present may be determined by a background material presentation strategy. The material presentation strategy may be determined according to authorization information of a user or a material pushing plan, etc. The to-be-presented splash presentation material may be understood as a splash presentation material to be presented for the current user at the current moment.

In S120, a splash presentation image of the splash presentation material is magnified, and the magnified splash presentation image is presented.

To satisfy the requirements of the user terminal for the playing effect of a large landscape image, the presentation material used by the terminal is generally a landscape-mode material. Moreover, considering that a presentation material may be delivered on different clients and different interfaces, the material producer may also be required to produce the landscape-mode material. Therefore, the splash presentation material is mostly a landscape-mode material. However, the general manner in which a user grips a terminal and the operating habits of the user usually cause the user, while watching a splash presentation material through the terminal, to open the client in the case where the terminal is vertically held. Since the splash presentation material is a landscape-mode material by default, the splash presentation content of the material can only be displayed in part of the display interface of the mobile phone and cannot be displayed in full screen. As a result, the display area of the image content of the splash presentation material is relatively small compared with the display area of the image content of the splash presentation material displayed when the mobile phone is horizontally held, leading to unsatisfactory content display effect and poor user viewing experience. The production of portrait-mode materials, although capable of solving the preceding problems, will undoubtedly increase the production cost. In the material presentation method provided by the technical solutions of the embodiment of the present disclosure, the splash presentation image of the splash presentation material is magnified for presentation, so that the problem is solved of small screen presentation area corresponding to the splash landscape-mode material when the terminal is vertically held without increasing the material production cost.

Magnifying the splash presentation image of the splash presentation material may refer to magnifying a designated region in the splash presentation image of the splash presentation material, or may refer to magnifying the entire region of the splash presentation image of the splash presentation material. For example, the entire region of the splash presentation image of the splash presentation material may be magnified proportionally. In this way, not only the display area of the splash presentation material on the screen is increased, but also the display effect in the original scale is maintained.

How many times the splash presentation image is magnified and the size after the magnification may be set according to the original size of the splash presentation material and the screen size, which are not limited herein. Exemplarily, the step of magnifying the splash presentation image of the splash presentation material may include: acquiring screen size information of a current display screen, and magnifying the splash presentation image of the to-be-presented splash presentation material according to the screen size information. The size of the splash presentation image is determined through the screen size information of the current display screen, so that the display interface of the terminal can be adapted to, and the problem is avoided that the display effect is not fine enough due to the excessive magnification of the image.

Exemplarily, the splash presentation material in the embodiment of the present disclosure may be a landscape-mode material, and the current screen presentation image may be a portrait-mode presentation image. For example, the height of the landscape-mode splash presentation material may be magnified to be the same as the height of the current display screen when the screen is playing vertically. In this way, the problem can be solved well that the presentation image of a landscape-mode video occupies a relatively small proportion of the presentation screen in the vertical screen state, and moreover, the splash presentation material can be displayed as finely as possible.

Since some contents may temporarily not be presented on the screen after the splash presentation material is magnified, it is required to determine the to-be-presented image after the splash presentation material is magnified. Therefore, the step of presenting the magnified splash presentation image may include: determining a current screen presentation image in the magnified splash presentation image, and playing the splash presentation material according to the current screen presentation image.

Exemplarily, the screen used for presenting the magnified splash presentation image may be divided into two or more subregions, and the image of at least one subregion is selected as the current screen presentation image, or the image of a part of at least one subregion is selected as the current screen presentation image. Selecting the image of at least one subregion may be understood as selecting the image of one subregion or selecting the images of two or more subregions for splicing, and the spliced image may be taken as the current screen presentation image.

Considering that key information may be located in a middle region when the material is presented, optionally, the step of determining the current screen presentation image in the magnified splash presentation image includes: acquiring an image region as the current screen presentation image, the image region is located at a middle part of the magnified splash presentation image and occupies a preset proportion of the magnified splash presentation image.

Alternatively, the step of determining the current screen presentation image in the magnified splash presentation image may further include: acquiring an image region as the current screen presentation image, the image region includes the key information in the splash presentation image, and the key information may include at least one of text information, object information or person information. Optionally, the key information in the splash presentation image may be determined by a preset image recognition algorithm.

The splash presentation material being a video material is taken as an example. The step of acquiring the image region including the key information in the splash presentation image may include steps described below. A preset number of video frames in the splash presentation image are acquired, or video frames within a preset playing duration of the splash presentation material are acquired; then a region where key information in each video frame is located in the each video frame is respectively determined as a to-be-presented region based on an image recognition algorithm; and the current screen presentation image is determined according to the number of the video frames and the to-be presented region corresponding to each video frame.

The step of determining the current screen presentation image according to the number of the video frames and the to-be presented region corresponding to each video frame may include steps described below. Each video frame is respectively divided into at least two subimage regions based on a preset region division method, and if the number of video frames of which the key information is located in the subimage regions occupies a preset proportion of the total number of the video frames, the subimage regions are determined as the current screen presentation image. Alternatively, the number of video frames of which the key information is located in the same subimage region is counted, respectively, and the subimage region corresponding to the maximum number of video frames is taken as the current screen presentation image.

Selecting the subregions may refer to taking the image of the subregion including relatively more key information as the current screen presentation image according to the acquired key information included in each subregion in the splash presentation image.

In the embodiment of the present disclosure, the step of magnifying the splash presentation image of the splash presentation material may be immediately magnifying the splash presentation image to a target magnified image when the presentation starts; or gradually magnifying the splash presentation image of the splash presentation material to a target magnified image when the presentation starts.

In S130, in a case where the splash presentation image satisfies a minifying condition, the splash presentation image is gradually minified.

Whether the splash presentation image satisfies the minifying condition may be determined according to the presentation duration of the splash presentation image. Optionally, in a case where a playing duration of the splash presentation image reaches a preset playing duration, the splash presentation image is gradually minified. Alternatively, a minifying start time is determined according to a preset minifying duration of the splash presentation image, and the splash presentation image is gradually minified according to the minifying start time.

Optionally, the step of gradually minifying the splash presentation image includes gradually minifying the splash presentation image to a preset presentation position of a news feed presentation material for presentation, where the material content of the news feed presentation material is the same as the material content of the splash presentation material.

Optionally, the preset presentation position may include a top position or a middle position of the page. The middle position of a news page may be determined according to the number of presentation positions in the current display screen, and the middle position may be understood as positions excluding the positions at the top and bottom of a news feed list page. For example, if the current display screen has five presentation positions, the presentation may be performed at the third presentation position, the second presentation position or the fourth presentation position. The preset presentation position may be a bottom position. The preset presentation position may be set according to actual requirements, which is not limited here.

Exemplarily, the news feed presentation material is forcibly inserted into the top position of the news feed list page, that is, the first position of the news feed list page. In this way, the order of the presentation, which is generally performed from top to bottom, of presentation materials at multiple presentation positions of the news feed list page is fully taken into consideration, so that the linkage between the splash presentation material and the news feed presentation material is established. When the playing of the splash presentation material is completed, the news feed presentation material is immediately presented on the top of the news feed list page, so that the delivery effect of the presentation material is improved.

Based on the present technical solutions, the material presentation method in the embodiment of the present disclosure may further include steps described below. In a case where the received to-be-presented splash presentation material carries a splash presentation identifier, a data update request carrying the splash presentation identifier is sent to a news feed server, so that a news feed presentation material corresponding to the splash presentation identifier is acquired.

When the data update request received by the server carries the splash presentation identifier, that is, when the current client supports the splash presentation, the news feed presentation material associated or having a corresponding relationship with the splash presentation identifier may be searched for according to the splash presentation identifier from a cache region storing news feed presentation materials.

When the user triggers the operation of starting the application program, a software development tool set in the client may determine whether the version corresponding to the application program supports the splash presentation. If the version corresponding to the application program supports the splash presentation, the client may acquire a splash presentation material, acquire an identifier corresponding to the splash presentation material, and send a data update request carrying the splash presentation identifier to the server. If the version corresponding to the application program does not support the splash presentation, the server may send a predetermined news feed presentation material to the client according to a preset presentation strategy in the background, so that the predetermined news feed presentation material is presented in a news feed presentation page of the client.

To quickly acquire a news feed presentation material having the same content as the splash presentation material, a corresponding relationship between the splash presentation identifier and a news feed presentation identifier may be preestablished. Optionally, the news feed presentation identifier corresponding to the splash presentation identifier is determined according to the preestablished corresponding relationship between the splash presentation identifier and the news feed presentation identifier.

The image of the splash presentation material may have the same content as the image presented by the news feed material. The splash presentation material is applied in a different scene from the news feed presentation material, so that the splash presentation material may have different data and a different identifier from the news feed presentation material. To acquire the news feed presentation material when the splash presentation material is acquired, the corresponding relationship between the splash presentation identifier and the news feed presentation identifier needs to be preestablished.

Presentation materials having the same presentation content are taken as the same presentation materials, marked with tags and stored separately, and then corresponding relationships between the presentation materials are determined according to the tags of the presentation materials. At this time, the step of acquiring the news feed presentation material may be that the news feed presentation identifier corresponding to the splash presentation identifier is searched for according to the splash presentation identifier from a corresponding relationship table, and the news feed presentation material corresponding to the news feed presentation identifier is acquired.

Exemplarily, the splash presentation image may be gradually minified to an original size of the default splash presentation image of the splash presentation material. Alternatively, the splash presentation image is gradually minified to a size of the preset presentation position of the news feed presentation material in the news feed presentation page. Therefore, the smooth transition can be achieved when the splash presentation image is gradually minified to the preset presentation position of the news feed presentation material.

The splash presentation material being a video material is taken as an example. The step of gradually minifying the splash presentation image may be that each video frame of the splash presentation material is acquired, and the presentation image of the each video frame is gradually minified to the original size. Optionally, the minifying scale or minifying size of each video frame may be determined according to the minifying duration and/or minifying speed of the splash presentation material from the start of minifying to the end of minifying. The minifying may be constant-speed minifying or variable-speed minifying, which is not limited here.

If the splash presentation material is in the form of a picture, the minifying scale or minifying size of the splash presentation material at each point in time may be determined according to the minifying duration and/or minifying speed of the splash presentation material from the start of minifying to the end of minifying.

In the embodiment of the present disclosure, optionally, the splash video image is minified before or at the end of the playing of splash video data.

According to the technical solutions of the embodiment, the splash presentation image of the splash presentation material is magnified and then is presented, so that the presentation area of the splash presentation image can be effectively increased. In this way, compared with the method of directly presenting in the original size, the screen image is larger, the visual effect is better, and the problem is solved of small screen presentation area corresponding to the landscape-mode material in the vertical screen state. Therefore, it is not necessary to produce portrait-mode videos, and thus the material production cost is reduced. Then, when the splash presentation image satisfies the minifying condition, the splash presentation image is gradually minified to the original size of the splash presentation image, so that the content of the splash material can be presented more comprehensively, the smooth transition of the presentation process is ensured, and the presentation effect of the splash material is improved.

Embodiment Two

Figure 2:
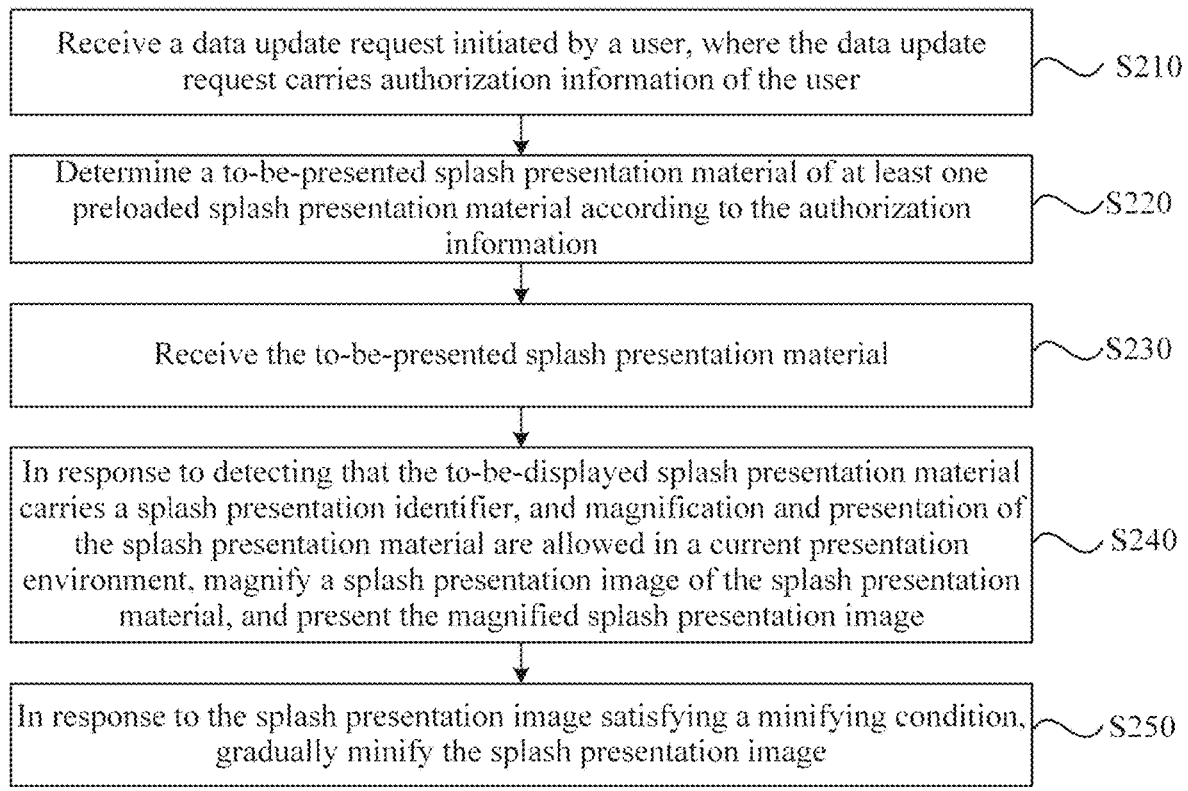
FIG. 2 is a flowchart of a material presentation method according to embodiment two of the present disclosure.

FIG. 2 is a flowchart of a material presentation method according to embodiment two of the present disclosure. The embodiment is illustrated based on the optional solutions in the preceding embodiment. In the embodiment, optionally, before a to-be-presented splash presentation image is received, the method may further include steps described below. A data update request initiated by a user is received, where the data update request carries authorization information of the user. The to-be-presented splash presentation material of at least one preloaded splash presentation material is determined according to the authorization information.

Based on the preceding technical solutions, before the splash presentation image is magnified, the method may further include the step described below. In a case where it is detected that the to-be-presented splash presentation material carries a splash presentation identifier, and magnification and presentation of the splash presentation material are allowed in a current presentation environment, the splash presentation image of the splash presentation material is magnified.

As shown in FIG. 2, the method in the embodiment may include steps described below.

In S210, a data update request initiated by a user is received, where the data update request carries authorization information of the user.

The data update request may be a news feed request (a feed request). The data update request may be triggered in multiple manners. Optionally, the data update request may be triggered by the operation of triggering an application software icon to open the application software on the client. Alternatively, if it is detected that the application software is running in the background for more than a preset period of time when the application software is returned to for use, the data update request is triggered.

In the embodiment of the present disclosure, the data update request carrying the authorization information of the user may be implemented in the manner that the authorization information of the user is acquired when a trigger operation for triggering data update is received, and the data update request is generated according to the trigger operation and the authorization information. The authorization information may be multiple pieces of attribute information authorized by the user in multiple manners.

In S220, a to-be-presented splash presentation material of at least one preloaded splash presentation material is determined according to the authorization information.

When only one splash presentation material exists, the splash presentation material may be directly used as the to-be-presented splash presentation material. When two or more splash presentation materials exist, the to-be-presented splash presentation material may be matched to the user according to the authorization information of the user. In this way, a more suitable splash presentation material can be matched to the user according to the requirements of the user, so that rational configuration of the splash presentation material can be achieved, and the user experience can be improved while the personalized requirements of the user is satisfied.

In this operation, it may be that whether a current splash presentation material of the at least one preloaded splash presentation material matches the authorization information is determined. In response to the current splash presentation material matching the authorization information, the current splash presentation material is determined as the to-be-presented splash presentation material. In response to the current splash presentation material not matching the authorization information, a next splash presentation material in a preset presentation order is determined as a current presentation material, and the operation of determining whether the current splash presentation material of the at least one preloaded splash presentation material matches the authorization information is repeatedly executed.

The preset presentation order may be an order randomly generated by the system according to the delivered splash presentation materials, or a presentation order set in advance by the user according to the requirements, which is not limited here. At the same time, the number of to-be-ordered splash presentation materials is also not limited.

In S230, the to-be-presented splash presentation material is received.

In S240, in a case where it is detected that the to-be-presented splash presentation material carries a splash presentation identifier, and magnification and presentation of the splash presentation material are allowed in a current presentation environment, a splash presentation image of the splash presentation material is magnified, and the magnified splash presentation image is presented.

The client first needs to determine whether the to-be-presented splash presentation material needs to be magnified and presented, and if the to-be-presented splash presentation material needs to be magnified and presented, the splash presentation image of the splash presentation material is magnified and presented. Whether the to-be-presented splash presentation material needs to be magnified and presented may be determined by detecting whether the to-be-presented splash presentation material carries the splash presentation identifier.

Optionally, the client further needs to determine whether the magnification and presentation of the splash presentation material are allowed in the current presentation environment. If the magnification and presentation of the splash presentation material are allowed in the current presentation environment, the splash presentation image of the splash presentation material is then magnified and presented, so that the application software is prevented from lagging or crashing when the client does not support the magnification and presentation of the splash presentation material, and thus the user experience is not affected. The current presentation environment may include the hardware and software environment of the terminal in which the client is installed, which is mainly to ensure that the client can present the splash presentation material.

The embodiment of the present disclosure does not limit the execution order of the preceding step of determining whether the to-be-presented splash presentation material needs to be magnified and presented and the step of determining whether the magnification and presentation of the splash presentation material are allowed in the current presentation environment. Whether the to-be-presented splash presentation material needs to be magnified and presented may be determined first, and then whether the magnification and presentation of the splash presentation material are allowed in the current presentation environment is determined. Conversely, whether the magnification and presentation of the splash presentation material are allowed in the current presentation environment may be determined first, and then whether the to-be-presented splash presentation material needs to be magnified and presented is determined.

Exemplarily, the client may perform determination through a software development kit (SDK) installed on the client.

In S250, in a case where the splash presentation image satisfies a minifying condition, the splash presentation image is gradually minified.

According to the technical solutions of the embodiment, the to-be-presented splash presentation material is determined through the authorization information of the user, and then the splash presentation material is presented in a targeted manner, so as to better satisfy the personalized requirements of the user. Then, after the splash presentation material is received and before the splash presentation image is magnified, whether the splash presentation material carries the splash presentation identifier is determined first, and if the splash presentation material carries the splash presentation identifier, it is considered that the splash presentation material needs to be magnified and presented. Moreover, whether the magnification and presentation of the splash presentation material are allowed in the current presentation environment is taken into full consideration. The magnification and presentation is performed after the magnification of the splash presentation material is allowed in the current presentation environment, so that the smooth presentation after the magnification of the splash presentation material is effectively ensured.

Embodiment Three

Figure 3:
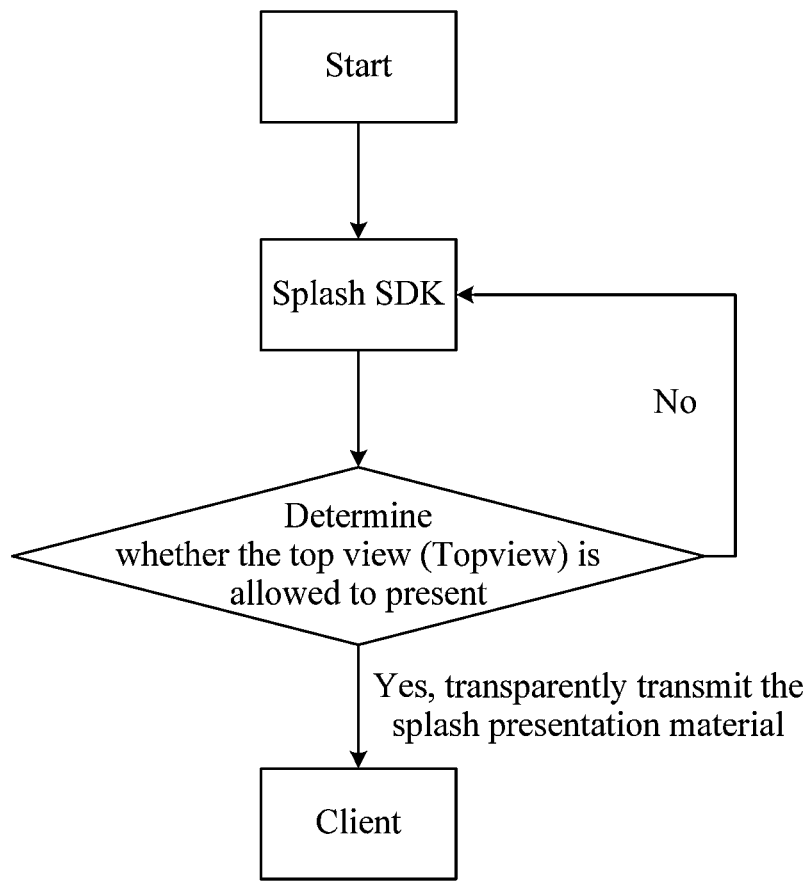
FIG. 3 is a flowchart of a material presentation method according to embodiment three of the present disclosure.

FIG. 3 in the embodiment three is a flowchart of a material presentation method according to embodiment three of the present disclosure. As shown in FIG. 3, the splash presentation material issued by a splash server being landscape-mode video data is taken as an example. The material presentation method provided in the embodiment may include steps described below.

In the splash stage, a client, before receiving a data update request (a feed request), needs to first complete interaction with a splash SDK, through which whether to present a splash presentation material top view (Topview) is determined. If it is determined that the splash presentation material Topview needs to be presented, a splash presentation identifier splash_ad_id is acquired, and plan data of the splash presentation material Topview is acquired according to the splash presentation identifier. A to-be-presented splash presentation material at the current moment may be determined according to the plan data of the splash presentation material Topview.

Optionally, after acquiring the splash presentation material, the client sends the feed request to a news feed server. A request parameter splash_ad_id is added to the feed request, so that news feed presentation data of a news feed plan corresponding to the splash presentation material Topview can be issued to the client following the current feed request.

On this basis, after data of the feed request is returned, the client needs to check whether a news feed presentation material returned at the current time contains news feed plan data corresponding to the splash presentation material Topview. If the news feed presentation material corresponding to the splash presentation identifier is acquired when the data update request carrying the splash presentation identifier is received, the acquired splash presentation material Topview and news feed presentation material are presented. If the news feed presentation material corresponding to the splash presentation identifier is not acquired when the data update request carrying the splash presentation identifier is received, a backup splash presentation material corresponding to the data update request is acquired and presented. The backup splash presentation material has a different material content or presentation effect from the target splash presentation material.

Whether the news feed presentation material corresponding to the splash presentation material is acquired may be determined according to a preestablished corresponding relationship between a news feed presentation identifier awesome_splash_id issued by a news feed server and the splash presentation identifier splash_ad_id issued by a splash server. For example, whether the news feed presentation identifier corresponding to the splash presentation identifier corresponding to the splash presentation material exists in a preestablished corresponding relationship table may be determined. If the corresponding news feed presentation identifier does not exist, the current splash presentation material is not presented, and the backup splash presentation material is presented.

Exemplarily, if the condition of presenting the current splash presentation material Topview is satisfied, the client magnifies the splash presentation material, for example, by three times proportionally, and then automatically identifies the middle 30% of the presentation image of the splash presentation material as a current screen presentation image.

When the presentation duration of the current screen presentation image reaches a preset duration, for example, reaches 3.5 seconds, the player of the client controls to minify the magnified splash presentation material to an original size, and then the splash presentation material is minified to a presentation position of the news feed presentation material for the continuous playing of the news feed presentation material.

When at least one operation such as a normal click, the calling of the application software and the jumps of internal pages of the application software is received in the splash stage, the client may use the splash presentation material returned by the SDK to achieve a response function corresponding to the preceding operation. The operation number of the at least one operation may also be recorded for viewing by the user.

The player of the client may automatically adapt to the video playing in the vertical screen state and horizontal screen state of the terminal. In the embodiment, optionally, the video source corresponding to the playing of the splash presentation material and the news feed presentation material is the same video, so that the smoothness of the transition motion effect can be ensured.

In addition, the embodiment of the present disclosure further provides a material presentation system including a client. The client may be configured to: receive a to-be-presented splash presentation material; magnify a splash presentation image of the splash presentation material, and present the magnified splash presentation image; and in a case where the splash presentation image satisfies a minifying condition, gradually minify the splash presentation image.

Before receiving the to-be-presented splash presentation material, the client may request a splash presentation material from a splash server and receive a splash presentation material issued by a preset cache region of the terminal installed with the client or issued by the splash server. The splash presentation material in the preset cache region is pre-issued by the splash server before the client requests the splash presentation material from the splash server.

Based on the preceding technical solutions, the material presentation method in the embodiment of the present disclosure may be that a client receives a to-be-presented splash presentation material, and in a case where the received to-be-presented splash presentation material carries a splash presentation identifier, the client sends a data update request carrying the splash presentation identifier to a news feed server, so as to acquire a news feed presentation material corresponding to the splash presentation identifier from the news feed server. The client receives a news feed presentation material issued by the news feed server and presents the splash presentation material. Further, after the splash presentation material is presented, the client presents the news feed presentation material.

The news feed server and the splash server may be integrated in the same physical server.

The splash presentation image may further be gradually minified to a preset presentation position of the news feed presentation material for presentation, where the material content of the news feed presentation material is the same as the material content of the splash presentation material.

According to the technical solutions of the embodiment of the present disclosure, the splash presentation material and the news feed presentation material correspond to the same material content, so that the material production cost of the material producer can be reduced, the smooth transition of the motion effect can be ensured when the splash presentation material is minified to the preset presentation position of the news feed presentation material and the news feed presentation material is continuously played, and thus the playing effect of the material is improved. Moreover, the splash presentation material is magnified and intercepted, so that central presentation of key elements is ensured, the material content is highlighted, and the presentation effect of the material is improved.

Embodiment Four

Figure 4:
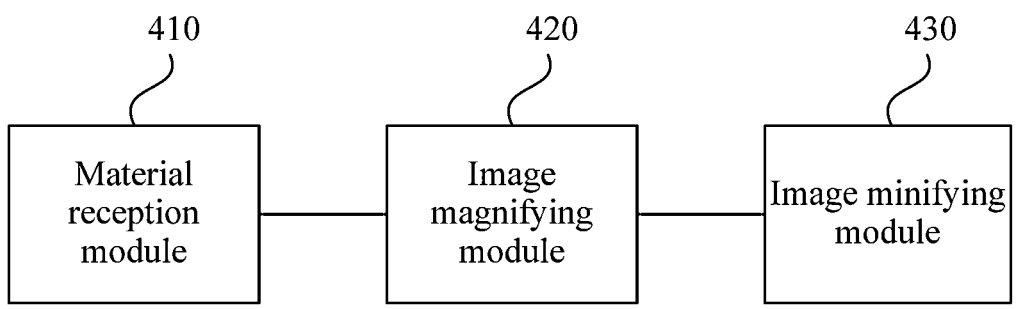
FIG. 4 is a structural diagram of a material presentation apparatus according to embodiment four of the present disclosure.

FIG. 4 is a structural diagram of a material presentation apparatus according to an embodiment of the present disclosure. The apparatus may be implemented by means of software and/or hardware and may be configured in a client for implementing the material presentation method of the embodiments of the present disclosure. As shown in FIG. 4, the material presentation apparatus of the embodiment includes a material reception module 410, an image magnifying module 420 and an image minifying module 430.

The material reception module 410 is configured to receive a to-be-presented splash presentation material. The image magnifying module 420 is configured to magnify a splash presentation image of the splash presentation material, and present the magnified splash presentation image. The image minifying module 430 is configured to in a case where the splash presentation image satisfies a minifying condition, gradually minify the splash presentation image.

Based on the preceding technical solutions, the image magnifying module 420 may be configured to: determine a current screen presentation image in the magnified splash presentation image, and play the splash presentation material according to the current screen presentation image.

Based on the preceding technical solutions, the image magnifying module 420 may be configured to: acquire an image region as the current screen presentation image, the image region is located at a middle part of the magnified splash presentation image and occupies a preset proportion of the magnified splash presentation image; or acquire an image region as the current screen presentation image, the image region includes key information in the splash presentation image, and the key information includes at least one of text information, object information or person information.

Based on the preceding technical solutions, optionally, the splash presentation material is a landscape-mode material, and the current screen presentation image is a portrait-mode presentation image.

Based on the preceding technical solutions, the image minifying module 430 may be configured to: in a case where a playing duration of the splash presentation image reaches a preset playing duration, gradually minify the splash presentation image; or determine a minifying start time according to a preset minifying duration of the splash presentation image, and gradually minify the splash presentation image according to the minifying start time.

Based on the preceding technical solutions, the material presentation apparatus may further include: a request reception module and a material determination module.

The request reception module is configured to before the to-be-presented splash presentation image is received, receive a data update request initiated by a user, where the data update request carries authorization information of the user. The material determination module is configured to determine the to-be-presented splash presentation material of at least one preloaded splash presentation material according to the authorization information.

Based on the preceding technical solutions, the material determination module is configured to: determine whether a current splash presentation material of the at least one preloaded splash presentation material matches the authorization information; and in response to the current splash presentation material matching the authorization information, determine the current splash presentation material as the to-be-presented splash presentation material; in response to the current splash presentation material not matching the authorization information, determine a next splash presentation material in a preset presentation order as a current presentation material, and repeatedly execute the operation of determining whether the current splash presentation material of the at least one preloaded splash presentation material matches the authorization information.

Based on the preceding technical solutions, the material presentation apparatus may further include a material detection module.

The material detection module is configured to before the splash presentation image is magnified, in a case where it is detected that the to-be-presented splash presentation material carries a splash presentation identifier, and magnification and presentation of the splash presentation material are allowed in a current presentation environment, magnify the splash presentation image of the splash presentation material.

Based on the preceding technical solutions, the image minifying module 430 may be configured to: gradually minify the splash presentation image to a preset presentation position of a news feed presentation material for presentation, where the material content of the news feed presentation material is the same as the material content of the splash presentation material.

Based on the preceding technical solutions, the image minifying module 430 may further be configured to: gradually minify the splash presentation image to a size of the preset presentation position of the news feed presentation material in a news feed presentation page.

Based on the preceding technical solutions, the material presentation apparatus may further include a news feed presentation material acquisition module.

The news feed presentation material acquisition module is configured to in a case where the received to-be-presented splash presentation material carries a splash presentation identifier, send a data update request carrying the splash presentation identifier to a news feed server, so as to acquire a news feed presentation material corresponding to the splash presentation identifier.

Based on the preceding technical solutions, the image minifying module 430 may be configured to: gradually minify the splash presentation image to an original size of the default splash presentation image of the splash presentation material.

Based on the preceding technical solutions, the image magnifying module 420 may be configured to: acquire screen size information of a current display screen, and magnify the splash presentation image of the splash presentation material according to the screen size information.

The preceding material presentation apparatus may execute the material presentation method provided in any embodiment of the present disclosure, and has functional modules and effects corresponding to the executed method.

Embodiment Five

Figure 5:
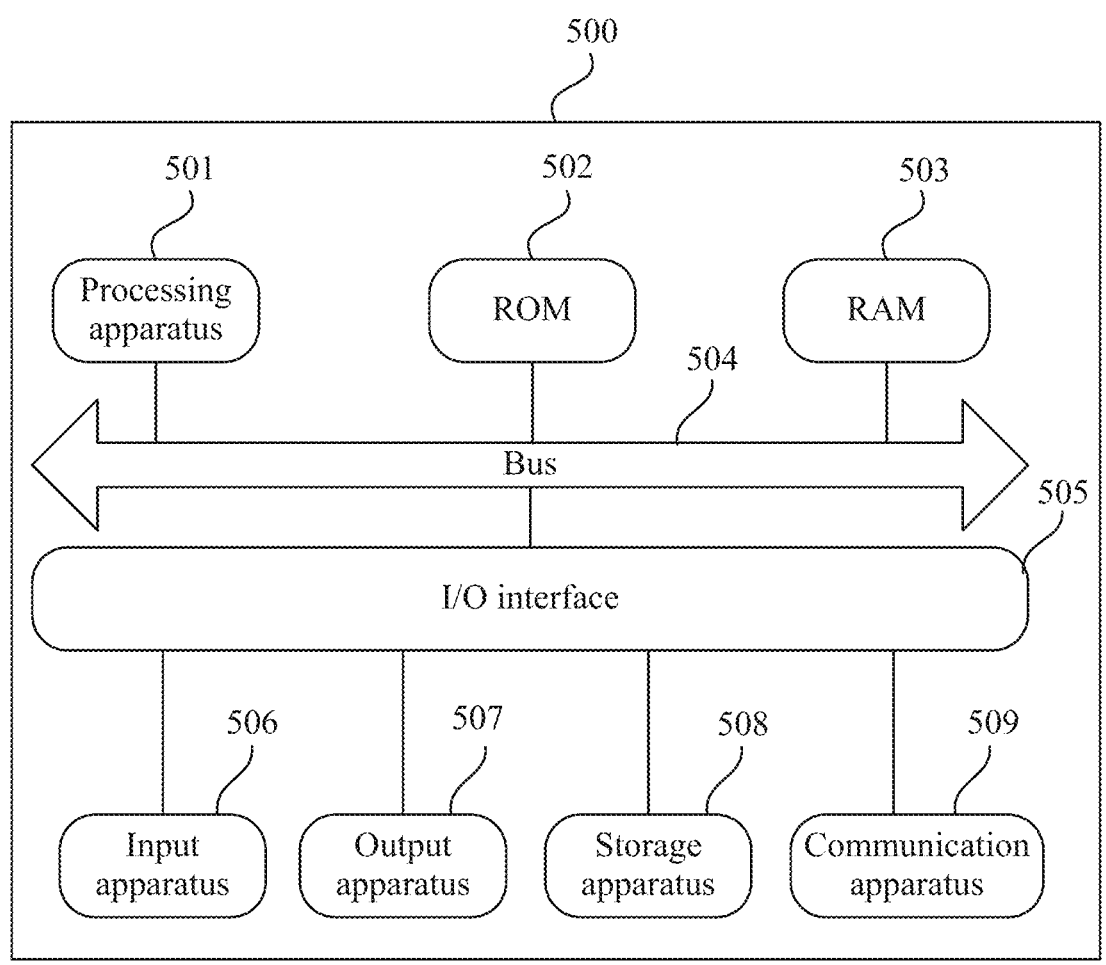
FIG. 5 is a structural diagram of an electronic device according to embodiment five of the present disclosure.

Referring to FIG. 5, FIG. 5 shows a structural diagram of an electronic device (such as the terminal device or server in FIG. 5) 500 applicable to implementing the embodiments of the present disclosure. The terminal device in the embodiments of the present disclosure may include, but is not limited to, mobile terminals such as a mobile phone, a laptop, a digital broadcast receiver, a personal digital assistant (PDA), a portable Android device (PAD), a portable media player (PMP) and a vehicle-mounted terminal (such as a vehicle-mounted navigation terminal), and fixed terminals such as a digital television (TV) and a desktop computer. The electronic device shown in FIG. 5 is merely an example and is not intended to limit the function and usage scope of the embodiments of the present disclosure.

As shown in FIG. 5, the electronic device 500 may include a processing apparatus (such as a central processing unit and a graphics processing unit) 501. The processing apparatus 501 may execute multiple appropriate actions and processing according to a program stored in a read-only memory (ROM) 502 or a program loaded into a random-access memory (RAM) 503 from a storage apparatus 508. The RAM 503 also stores various programs and data required for the operation of the electronic device 500. The processing apparatus 501, the ROM 502 and the RAM 503 are connected to each other through a bus 504. An input/output (I/O) interface 505 is also connected to the bus 504.

Generally, the following apparatuses may be connected to the I/O interface 505: an input apparatus 506 such as a touch screen, a touch pad, a keyboard, a mouse, a camera, a microphone, an accelerometer and a gyroscope; an output apparatus 507 such as a liquid crystal display (LCD), a speaker and a vibrator; the storage apparatus 508 such as a magnetic tape and a hard disk; and a communication apparatus 509. The communication apparatus 509 may allow the electronic device 500 to perform wireless or wired communication with other devices so as to exchange data. Although FIG. 5 shows the electronic device 500 having various apparatuses, not all the apparatuses shown here need to be implemented or present. Alternatively, more or fewer apparatuses may be implemented or present.

According to embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded from a network and installed through the communication apparatus 509, or may be installed from the storage apparatus 508, or may be installed from the ROM 502. When the computer program is executed by the processing apparatus 501, the preceding functions defined in the method of the embodiments of the present disclosure are executed.

The electronic device provided in the embodiment of the present disclosure belongs to the same inventive concept as the material presentation method provided in the preceding embodiments. For the technical details not described in detail in the embodiment, reference may be made to the preceding embodiments, and the embodiment has the same beneficial effects as the preceding embodiments.

Embodiment Six

An embodiment of the present disclosure provides a computer storage medium storing a computer program which, when executed by a processor, implements the material presentation method provided in the preceding embodiments.

The computer-readable medium described above in the present disclosure may be a computer-readable signal medium or a computer-readable storage medium or any combination thereof. The computer-readable storage medium may be, but not limited to, an electrical, magnetic, optical, electromagnetic, infrared, or semiconductor system, apparatus, or device, or any combination thereof. The computer-readable storage medium may include, but not limited to, an electrical connection having one or more wires, a portable computer magnetic disk, a hard disk, a RAM, a ROM, an erasable programmable read-only memory (EPROM) or a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus, or device. The program codes included in the computer-readable medium may be transmitted in any suitable medium, including, but not limited to, a wire, an optical cable, a radio frequency (RF), or any suitable combination thereof.

The computer-readable medium may be included in the electronic device or may exist alone without being assembled into the electronic device.

The preceding computer-readable medium carries one or more programs which, when executed by the electronic device, cause the electronic device to receive a to-be-presented splash presentation material; magnify a splash presentation image of the splash presentation material, and present the magnified splash presentation image; and in a case where the splash presentation image satisfies a minifying condition, gradually minify the splash presentation image to an original size of the splash presentation image.

Computer program codes for executing the operations of the present disclosure may be written in one or more programming languages or combination thereof, including object-oriented programming languages such as Java, Smalltalk, C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show possible architectures, functions and operations of the method and computer program product according to multiple embodiments of the present disclosure. In this regard, each block in the flowcharts or block diagrams may represent a module, a program segment, or part of codes that contains one or more executable instructions for implementing specified logical functions. In some alternative implementations, the functions marked in the blocks may occur in an order different from that marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations or a combination of special-purpose hardware and computer instructions.

The modules or units involved in the embodiments of the present disclosure may be implemented by software or hardware. The name of a module or unit is not intended to limit the module or unit in a certain circumstance.

The functions described above herein may be executed, at least partially, by one or more hardware logic components. For example, without limitations, exemplary types of hardware logic components that may be used include: a field programmable gate array (FPGA), an application specific integrated circuit (ASIC), application specific standard parts (ASSP), a System on a Chip (SOC), a complex programmable logic device (CPLD) and the like.

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. Examples of the machine-readable storage medium may include an electrical connection based on one or more wires, a portable computer disk, a hard disk, a RAM, a ROM, an EPROM or a flash memory, an optical fiber, a CD-ROM, an optical storage device, a magnetic storage device, or any suitable combination thereof.

What is claimed is:

1. A material presentation method, comprising:
   receiving a to-be-presented splash presentation material which is a material presented before a news feed presentation material is presented when an application of a client is opened;
   magnifying a splash presentation image of the to-be-presented splash presentation material, and presenting the magnified splash presentation image; and
   in response to the presented magnified splash presentation image satisfying a minifying condition, minifying the presented magnified splash presentation image;
   wherein magnifying a splash presentation image of the to-be-presented splash presentation material, and presenting the magnified splash presentation image comprises:
      determining a screen presentation image in the magnified splash presentation image, and in response to the application being opened, playing the to-be-presented splash presentation material according to the screen presentation image;
   wherein determining the screen presentation image in the magnified splash presentation image comprises:
      acquiring an image region as the screen presentation image, wherein the image region is located at a middle part of the magnified splash presentation image and occupies a preset proportion of the magnified splash presentation image; or
      acquiring an image region as the screen presentation image, wherein the image region comprises key information in the magnified splash presentation image, and the key information comprises at least one of text information, object information or person information, and
   wherein minifying the presented magnified splash presentation image comprises:
      minifying the presented magnified splash presentation image to a preset presentation position of the news feed presentation material for presentation, wherein a material content of the news feed presentation material is the same as a material content of the to-be-presented splash presentation material.

2. The method according to claim 1, wherein the to-be-presented splash presentation material is a landscape-mode material, and the screen presentation image is a portrait-mode presentation image.

3. The method according to claim 1, wherein in the case where the presented magnified splash presentation image satisfies the minifying condition, minifying the presented magnified splash presentation image comprises:
   in response to a playing duration of the presented magnified splash presentation image reaching a preset playing duration, minifying the presented magnified splash presentation image; or
   determining a minifying start time according to a preset minifying duration of the presented magnified splash presentation image, and minifying the presented magnified splash presentation image according to the minifying start time.

4. The method according to claim 1, before receiving the to-be-presented splash presentation material, further comprising:
   receiving a data update request initiated by a user, wherein the data update request carries authorization information of the user; and
   determining the to-be-presented splash presentation material of at least one preloaded splash presentation material according to the authorization information.

5. The method according to claim 4, wherein determining the to-be-presented splash presentation material of the at least one preloaded splash presentation material according to the authorization information comprises:
   determining whether a current splash presentation material of the at least one preloaded splash presentation material matches the authorization information; and
   in response to the current splash presentation material matching the authorization information, determining the current splash presentation material as the to-be-presented splash presentation material;
   in response to the current splash presentation material not matching the authorization information, determining a next splash presentation material of the at least one preloaded splash presentation material as a current splash presentation material according to a preset presentation order, and repeatedly executing the operation of determining whether the current splash presentation material of the at least one preloaded splash presentation material matches the authorization information.

6. The method according to claim 1, before magnifying the splash presentation image, further comprising:
   in response to detecting that the to-be-presented splash presentation material carries a splash presentation identifier, and magnification and presentation of the to-be-presented splash presentation material are allowed in a presentation environment, magnifying the splash presentation image of the to-be-presented splash presentation material.

7. The method according to claim 1, wherein minifying the presented magnified splash presentation image comprises:
   minifying the presented magnified splash presentation image to a size of the preset presentation position of the news feed presentation material in a news feed presentation page.

8. The method according to claim 1, further comprising:
   in response to the received to-be-presented splash presentation material carrying a splash presentation identifier, sending a data update request carrying the splash presentation identifier to a news feed server to acquire the news feed presentation material corresponding to the splash presentation identifier.

9. The method according to claim 1, wherein minifying the presented magnified splash presentation image comprises:
   minifying the presented magnified splash presentation image to an original size of the splash presentation image of the to-be-presented splash presentation material.

10. The method according to claim 1, wherein magnifying the splash presentation image of the to-be-presented splash presentation material comprises:
    acquiring screen size information of a display screen, and magnifying the splash presentation image of the to-be-presented splash presentation material according to the screen size information.

11. An electronic device, comprising:
    at least one processing apparatus; and
    a memory configured to store at least one program;

wherein the at least one program, when executed by the at least one processing apparatus, causes the at least one processing apparatus to implement:

receiving a to-be-presented splash presentation material which is a material presented before a news feed presentation material is presented when an application of a client is opened;

magnifying a splash presentation image of the to-be-presented splash presentation material, and presenting the magnified splash presentation image; and in response to the presented magnified splash presentation image satisfying a minifying condition, minifying the presented magnified splash presentation image;

wherein magnifying a splash presentation image of the to-be-presented splash presentation material, and presenting the magnified splash presentation image comprises:

determining a screen presentation image in the magnified splash presentation image, and in response to the application being opened, playing the to-be-presented splash presentation material according to the screen presentation image;

wherein determining the screen presentation image in the magnified splash presentation image comprises:

acquiring an image region as the screen presentation image, wherein the image region is located at a middle part of the magnified splash presentation image and occupies a preset proportion of the magnified splash presentation image; or acquiring an image region as the screen presentation image, wherein the image region comprises key information in the magnified splash presentation image, and the key information comprises at least one of text information, object information or person information, and wherein minifying the presented magnified splash presentation image comprises:

minifying the presented magnified splash presentation image to a preset presentation position of the news feed presentation material for presentation, wherein a material content of the news feed presentation material is the same as a material content of the to-be-presented splash presentation material.

12. The electronic device according to claim 11, wherein the to-be-presented splash presentation material is a landscape-mode material, and the screen presentation image is a portrait-mode presentation image.

13. The electronic device according to claim 11, wherein the computer program is further configured to:

in response to the received to-be-presented splash presentation material carrying a splash presentation identifier, send a data update request carrying the splash presentation identifier to a news feed server to acquire the news feed presentation material corresponding to the splash presentation identifier.

14. A non-transitory computer-readable storage medium storing a computer program which, when executed by a processor, implements:

receiving a to-be-presented splash presentation material which is a material presented before a news feed presentation material is presented when an application of a client is opened;

magnifying a splash presentation image of the to-be-presented splash presentation material, and presenting the magnified splash presentation image; and in response to the presented magnified splash presentation image satisfying a minifying condition, minifying the presented magnified splash presentation image;

wherein magnifying a splash presentation image of the to-be-presented splash presentation material, and presenting the magnified splash presentation image comprises:

determining a screen presentation image in the magnified splash presentation image, and in response to the application being opened, playing the to-be-presented splash presentation material according to the screen presentation image;

wherein determining the screen presentation image in the magnified splash presentation image comprises:

acquiring an image region as the screen presentation image, wherein the image region is located at a middle part of the magnified splash presentation image and occupies a preset proportion of the magnified splash presentation image; or acquiring an image region as the screen presentation image, wherein the image region comprises key information in the magnified splash presentation image, and the key information comprises at least one of text information, object information or person information, and wherein minifying the presented magnified splash presentation image comprises:

minifying the presented magnified splash presentation image to a preset presentation position of the news feed presentation material for presentation, wherein a material content of the news feed presentation material is the same as a material content of the to-be-presented splash presentation material.

* * * * *